Oct. 24, 1933. A. A. GOESE ET AL 1,931,843
HEATING APPARATUS
Filed Jan. 30, 1931  2 Sheets-Sheet 1
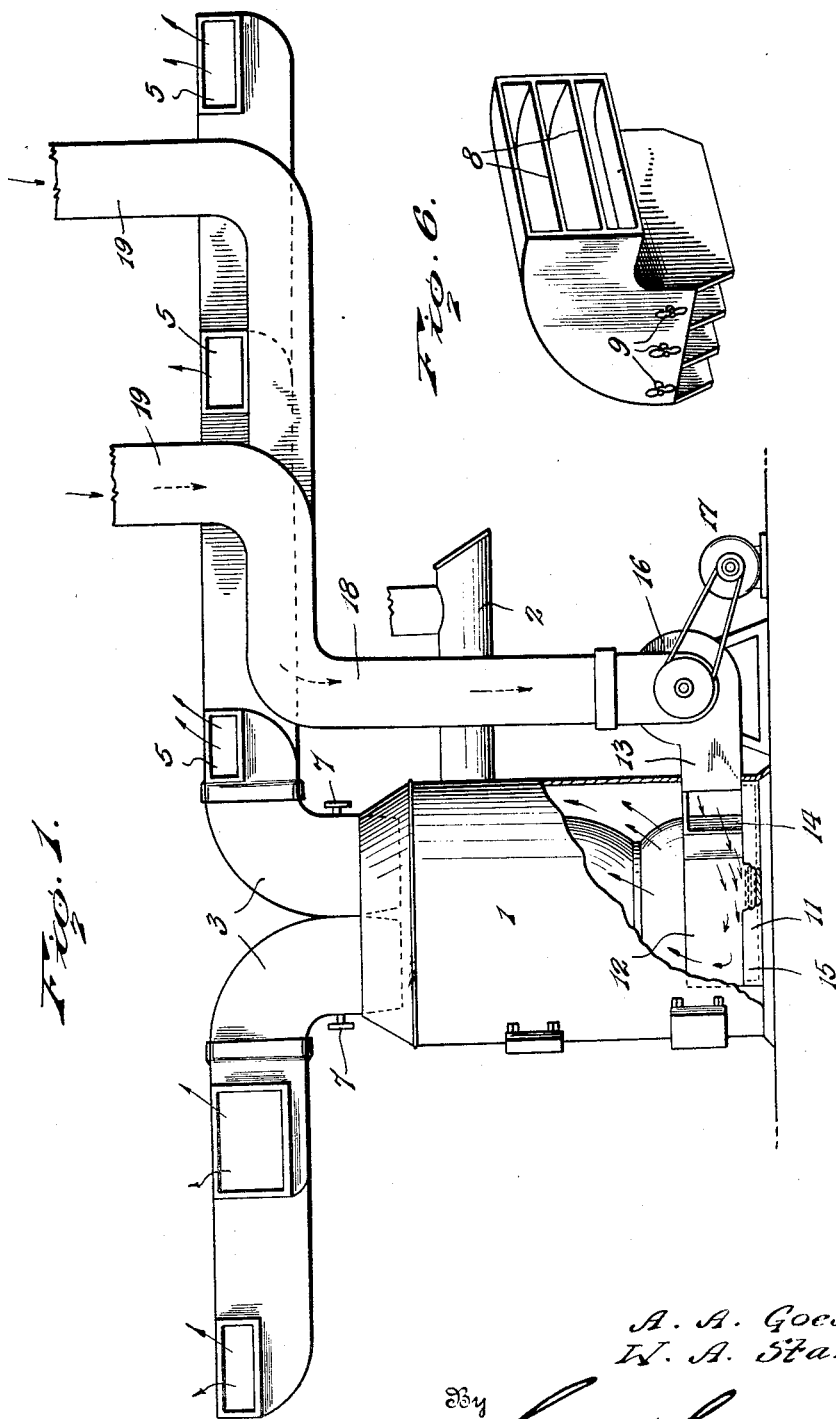
Inventors
A. A. Goese.
W. A. Stark.
By Lacy & Lacy,
Attorneys Oct. 24, 1933.   A. A. GOESE ET AL   1,931,843
HEATING APPARATUS
Filed Jan. 30, 1931   2 Sheets-Sheet 2
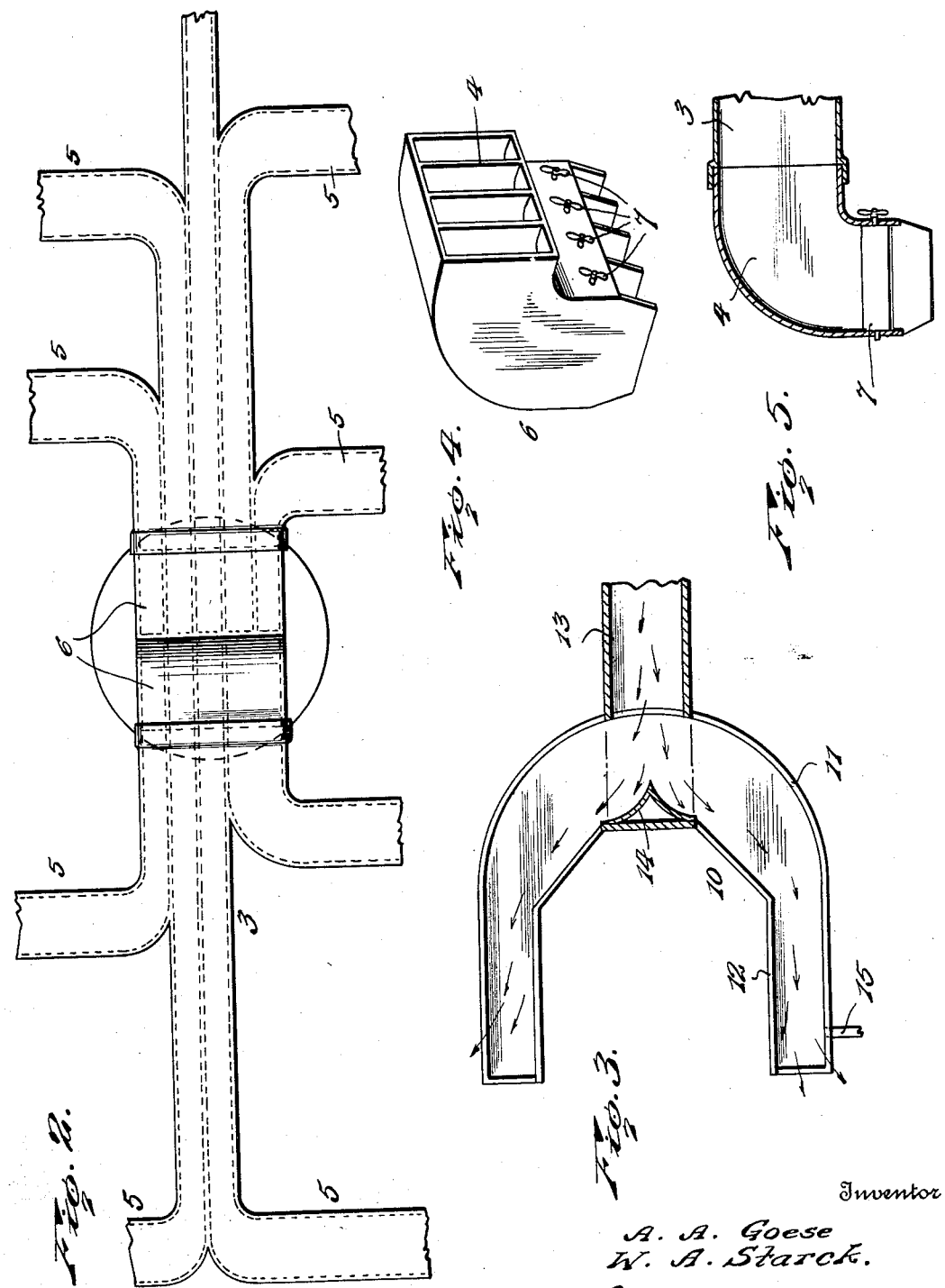

Patented Oct. 24, 1933

1,931,843

UNITED STATES PATENT OFFICE 1,931,843

HEATING APPARATUS

Arthur A. Goese and William A. Starck, Milwaukee, Wis.

Application January 30, 1931. Serial No. 512,416

3 Claims. (Cl. 126—99)

This invention has for its object the provision of novel, simple, inexpensive and efficient means whereby a circulation of air within a building may be maintained and the air effectually distributed and directed to the various parts of the building. The invention is illustrated in the accompanying drawings and will be hereinafter first fully described and then more particularly defined in the appended claims.

In the drawings:

Figure 1 is a side elevation, partly broken away, of a heating system embodying the invention, Fig. 2 is a plan view of a portion of the apparatus, Fig. 3 is an enlarged plan view, with parts in horizontal section, of the water pan, Fig. 4 is a detail perspective view showing one form of air ducts which may be employed, Fig. 5 is a vertical longitudinal section through the device shown in Fig. 4, and Fig. 6 is a view similar to Fig. 4 but showing an alternate arrangement.

In the drawings, the reference numeral 1 indicates a hot air furnace which may be of any approved type. Extending from the fire compartment of the furnace through the outer casing thereof is the usual smoke pipe 2, and extending from the top of the shell are the circulating flues 3. The circulating flues are each provided with partitions 4 which extend longitudinally thereof and serve to divide the rising outflowing hot air into a plurality of streams which pass to separate outlets or flues 5 whereby the heated air is caused to circulate through the building in a well-known manner. The circulating ducts are caused to meet over the furnace in heads 6 which are in the form of elbows and within which are continuations of the partitions 4, as will be understood upon reference to Fig. 4. The lower ends of these heads are open to freely admit the hot air which rises between the body of the furnace and the outer casing or shell thereof, and within each of the sub-flues or passages defined by the several partitions is a damper, indicated at 7, whereby the flow of hot air to any particular point may be cut off or regulated independently of the air which flows through the other flues. In Figs. 4 and 5, the partitions 4 are disposed vertically but they may be disposed horizontally, as shown in Fig. 6 at 8, in which event the dampers, as indicated at 9, will be arranged transversely or at right angles to the position assumed in the arrangement illustrated in Figs. 4 and 5.

Within the lower portion of the furnace is disposed a water pan 10, the outer wall 11 of which is relatively shallow and conforms to the interior of the outer shell of the furnace. The inner wall 12 of the pan extends appreciably above the pan so that the inflowing cold air will be prevented from impinging directly against the hot body of the furnace, and this cold air is admitted to the furnace through a conduit 13 which extends through the shell of the furnace, as shown in Fig. 1. Immediately opposite the end of said conduit, on the inner wall 12 of the pan, is a deflector 14 whereby the inflowing air is divided and directed toward the opposite sides of the pan to flow over the water therein, eventually rising from the pan through the space between the inner and outer shells of the furnace. The outer wall of the pan is provided with an overflow pipe 15 which extends through the outer shell of the furnace and serves as a positive indication when the pan is full. The conduit 13 contains a rotary blower or fan, indicated at 16, which is driven by an electric motor 17 in an obvious manner, and the air is brought to this fan or blower through a pipe or conduit 18 which has branches, indicated at 19, disposed throughout the building whereby the cooled air will be returned to the furnace and a constant circulation of the air will be maintained, stagnation with its ill effects being consequently positively avoided. It will be understood, of course, that the return conduit 18 may have a branch leading to a point outside the building so that there will be a constant and sufficient supply of fresh air added to the circulating currents so that circulation will be of non-vitiated air. The water pan is shallow but relatively wide so that there will be a sufficient surface of water presented to the circulating air to permit the air to take up sufficient moisture to avoid the drying out of furniture and woodwork, as well as the ill effects upon the human system, which are caused by exposure to excessively dry hot air.

The apparatus embodying the invention is very simple and compact and may be installed in any building at a relatively low cost. It will operate efficiently at all times to maintain the desired temperature in the building and cause a constant circulation of the air. The motor 17 may be connected with a thermostat placed at any selected point of the building so that the operation of the motor will be dependent upon the temperature in the building, additional heated air being supplied as the temperature in the building drops, and the inflow of heated air being arrested when the temperature reaches a predetermined degree. These thermostats are well known and do not form any part of the invention so that illustration of the same is deemed unnecessary.

Having thus described the invention, we claim:

1. In a heating apparatus, the combination with a hot air furnace, of a head fitted to the top of the furnace, a plurality of partitions within said head, a single air flue leading from the head and provided with interior longitudinal partitions alining with the partitions in the head, said flue having a plurality of outlets each in communication with the space between two partitions or the space betwen a partition and a wall of the flue, and a plurality of dampers in the lower end of the head located between the several partitions and the sides of the head for controlling the flow of air betwen the longitudinal partitions of the single flue.

2. In a heating apparatus, the combination with a hot air furnace, of a head fitted to the top of the furnace and provided with a lateral extension, a plurality of partitions disposed within the head and terminating flush with the outer end of the lateral extension thereof, a single air flue fitting over and detachably secured to the lateral extension of the head and provided with interior longitudinal partitions alining with the partitions in said lateral extension, said single flue having a plurality of outlets in communication with the space between the partitions or the space between a partition and a wall of the flue, a cold air flue feeding air to the bottom of the furnace, means for positively effecting circulation of air through said flues, and a plurality of dampers arranged within the head and located between the several partitions and sides of the head for controlling the flow of air between the longitudinal partitions of the single flue.

3. In a heating apparatus, the combination with a hot air furnace, of independent heads fitted to the top of the furnace and provided with lateral extensions projecting in opposite directions, a plurality of partitions disposed within each head and terminating flush with the outer end of the lateral extension thereof, an air flue fitting over and detachably secured to the lateral extension of each head and each provided with interior longitudinal partitions alining with the partitions in the lateral extensions of the heads, said flues having a plurality of outlets each in communication with the space between two partitions or the space between a partition and a wall of the flue, and a plurality of dampers in the lower end of each head located between the several partitions and the sides of the head for controlling the flow of air between the longitudinal partitions of said flues.

ARTHUR A. GOESE. [L. s.]
WILLIAM A. STARCK. [L. s.]